(12) United States Patent
Geiser et al.

(10) Patent No.: US 10,612,674 B2
(45) Date of Patent: Apr. 7, 2020

(54) VALVE, IN PARTICULAR A VACUUM VALVE

(71) Applicant: VAT Holding AG, Haag (CH)

(72) Inventors: Friedrich Geiser, Nuziders (AT); Anton Neumeier, Mering (DE); Rico Rohner, Widnau (CH)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 15/743,835

(22) PCT Filed: Jul. 27, 2016

(86) PCT No.: PCT/EP2016/067891
§ 371 (c)(1),
(2) Date: Jan. 11, 2018

(87) PCT Pub. No.: WO2017/025329
PCT Pub. Date: Feb. 16, 2017

(65) Prior Publication Data
US 2018/0195623 A1    Jul. 12, 2018

(30) Foreign Application Priority Data
Aug. 11, 2015 (AT) .................. A 528/2015

(51) Int. Cl.
*F16K 3/14* (2006.01)
*F16K 51/02* (2006.01)
(Continued)

(52) U.S. Cl.
CPC ............... *F16K 3/14* (2013.01); *F16K 3/186* (2013.01); *F16K 3/314* (2013.01); *F16K 3/3165* (2013.01); *F16K 51/02* (2013.01)

(58) Field of Classification Search
CPC . F16K 3/14; F16K 3/186; F16K 3/184; F16K 3/12; F16K 3/3165; F16K 3/314; F16K 3/0254; F16K 51/02
See application file for complete search history.

(56) References Cited

U.S. PATENT DOCUMENTS

| 1,752,456 A | * | 4/1930 | Pillatt | ........................ F16K 3/12 251/174 |
| 4,809,950 A | | 3/1989 | Geiser | |

(Continued)

FOREIGN PATENT DOCUMENTS

| DE | 1060678 | 7/1959 |
| DE | 1214960 | 4/1966 |

(Continued)

*Primary Examiner* — Marina A Tietjen
(74) *Attorney, Agent, or Firm* — Volpe and Koenig, P.C.

(57) ABSTRACT

A valve (1), in particular a vacuum valve, with at least one closure member (2) which has a wedge-shaped closure region (3), and with at least one valve seat (5) which surrounds a valve opening (4) of the valve (1), wherein, in a closed position of the closure member (2), the wedge-shaped closure region (3) bears sealingly against the valve seat (5) and closes the valve opening (4) and, in an open position, opens up the valve opening (4) so that fluids and/or solids can be transported through the valve opening (4), wherein the closure member (2) with the wedge-shaped closure region (3) is mounted so as to be movable back and forth between the closed position and the open position along a movement path (6), wherein the movement path (6) is angled-off and/or bent.

14 Claims, 7 Drawing Sheets

(51) Int. Cl.
*F16K 3/02* (2006.01)
*F16K 3/12* (2006.01)
*F16K 3/18* (2006.01)
*F16K 3/316* (2006.01)
*F16K 3/314* (2006.01)

(56) References Cited

U.S. PATENT DOCUMENTS

| | | | | |
|---|---|---|---|---|
| 4,921,213 | A * | 5/1990 | Geiser | F16K 3/0218 |
| | | | | 251/326 |
| 2006/0049374 | A1* | 3/2006 | Ehrne | F16K 3/0218 |
| | | | | 251/327 |
| 2008/0083897 | A1 | 4/2008 | Chen | |
| 2009/0302257 | A1* | 12/2009 | Gehrig | F16K 3/04 |
| | | | | 251/301 |
| 2014/0042354 | A1 | 2/2014 | Orr | |

FOREIGN PATENT DOCUMENTS

| | | |
|---|---|---|
| DE | 1902454 | 8/1970 |
| DE | 2828829 | 1/1980 |
| EP | 2541591 | 1/2013 |
| JP | S51101226 | 9/1976 |
| JP | 2003097736 | 4/2003 |
| JP | 2005076836 | 3/2005 |
| WO | 2005064236 | 7/2005 |

\* cited by examiner

VALVE, IN PARTICULAR A VACUUM VALVE

BACKGROUND

The present invention relates to a valve, in particular a vacuum valve, with at least one closure member which has a wedge-shaped closure region and with at least one valve seat surrounding a valve opening of the valve, wherein, in a closed position of the closure member, the wedge-shaped closure region lies against the valve seat in sealing fashion and closes the valve opening and, in an open position, frees the valve opening for fluids and/or solids to be transported through the valve opening, wherein the closure member with the wedge-shaped closure region is mounted so that it can move back and forth on a movement path between the closed position and the open position.

Valves of the abovementioned type are known from the prior art in multiple embodiments. Because of the wedge-shaped closure region of the closure member, they are often also referred to as so-called wedge valves. In the prior art, wedge valves are moved linearly exclusively in one direction between the open position and the closed position. Opening, in other words the movement of the closure member from the closed position into the open position, then takes place exclusively linearly in the opposite direction.

Wedge valves have the advantage that relatively high sealing forces can be achieved relatively easily when the valve closes. For this reason, wedge valves of the type mentioned are also often used in so-called dirty processes, i.e. processes in which particles carried along with the fluids transported through the valve opening are deposited in the valve and hence contaminate the valve and in particular the valve seat as well.

SUMMARY

The object of the invention is to provide an alternative embodiment for a valve of the abovementioned type.

To this end, it is provided according to the invention that the movement path is angled and/or curved.

In contrast to the prior art, in the valves according to the invention it is thus provided that the closure member, preferably the whole closure member, is moved between the closed position and the open position not only in each case linearly in one direction but also on an angled and/or curved movement path. This makes additional design options possible for the valve according to the invention which can also in particular be used to employ a valve or wedge valve even in environments in which highly contaminated fluids and/or solids need to be transported through the valve opening.

In order to guide the closure member along the angled and/or curved movement path, preferred alternative embodiments of the invention provide that the valve has at least one slide path for guiding the closure member along the movement path, wherein the slide path is angled or curved. In connection with this, it is particularly preferred that the valve has a roller or at least one slider for guiding the closure member along the movement path, wherein the roller or the slider is guided by the slide path. In connection with this, it should be pointed out that the slide path can be designed both on the closure member and on other components of the valve, for example on a valve housing of the valve. In preferred alternative embodiments, multiple slide paths for guiding the closure member are provided. The same applies for the rollers and sliders as for the slide path. The rollers or sliders can also be arranged both on the closure member and on another component of the valve, in particular on a valve housing, and be fixed, or optionally rotatably, in their position. The slide path or slide paths can be, for example, rails, grooves, and the like.

Preferred alternative embodiments provide that the movement path is divided into multiple movement path sections, preferably into two, particularly preferably into at least three movement path sections. These movement path sections can be angled relative to one another or be curved with different bend radii. However, in other exemplary embodiments it can be a curved movement path with only a single bend radius. In this case, it may then not be possible to distinguish between different movement path sections. If different movement path sections can be identified, preferred embodiments of the invention provide that in each case two successive movement path sections of the movement path and/or in each case two successive slide path sections of the slide path enclose an angle of 135° to 170°, preferably 145° to 155°. It should be pointed out that the term "angled" here does not mean only the exact formation of angles. Rather, it can also be provided that certain bend radii are taken into account in the angling. In a particularly preferred embodiment of the invention, in each case the two successive movement path sections of the movement path and/or the corresponding slide path sections of the slide path are arranged at an angle of 150° relative to one an other.

Preferred embodiments provide that the movement path and/or at least one slide path that may be present is or are angled preferably at least twice.

It can, for example, be provided that the movement path has a central movement path section and two movement path sections which are connected in each case to the ends of the central movement section, wherein the movement path sections which are connected in each case at their ends are in each case arranged at an angle relative to the central movement section. It is equally possible to provide that the at least one slide path has a central slide path section and two slide path sections which are connected in each case to the ends of the central slide section, wherein the slide path sections which are connected in each case at their ends are in each case arranged at an angle relative to the central slide path section. It can also be provided that the whole movement path is designed so that it is curved.

Particularly preferred embodiments of the invention provide that the closure member has, in addition to the wedge-shaped closure region, a wedge-shaped passage region which surrounds a transfer opening in the closure member, wherein, in the open position, the closure member bears with the passage region in sealing fashion against the valve seat, and the transfer opening of the closure member for the through transportation of fluids and/or solids is arranged, in the open position, so that it is aligned with the valve opening. In other words, in these alternative embodiments it is provided that the closure member has two wedge-shaped regions which are different from each other, namely the wedge-shaped closure region and the wedge-shaped passage region. In the case of these valves, there are preferably two positions of the closure member which are different from each other and in which the closure member is pressed in sealing fashion against the valve seat and bears against it. In one position of the closure member, the wedge-shaped closure region of the closure member bears in sealing fashion against the valve seat. In the other position, the wedge-shaped passage region of the closure member bears in sealing fashion against the valve seat. In the latter position, the open position of the valve is obtained by the transfer opening of the passage region of the closure member being aligned with the valve opening such that fluids and/or solids can be guided in this open position through the valve opening and the transfer opening. In other words, in these alternative embodiments it is thus provided that the closure member is pressed in sealing fashion against the valve seat and bears against it in sealing fashion both in the open position and in the closed position. The transporting of fluids and/or solids through the valve opening is here enabled by a transfer opening being present in the wedge-shaped passage region. These alternative embodiments can particularly preferably then be used when fluids and/or solids with a relatively high amount of particles need to be transported through the valve opening. In the case of such fluids and/or solids, there is a particularly high risk that the undesired deposition of particles could occur in the valve, which can be prevented by the preferred embodiments of the invention.

In this connection, it is particularly favorable if the transfer opening is surrounded by a transfer opening limiting wall of the passage region of the closure member in order to prevent the penetration of the fluids and/or solids into the interior of the valve housing. This transfer opening limiting wall is produced automatically when the wedge-shaped passage region of the closure member is manufactured from a solid material. If the passage region of the closure member is, in contrast, designed as a hollow body with two limiting walls arranged relative to each other to form a wedge shape, the transfer opening limiting wall can be designed as a separate connecting wall between these two limiting walls arranged so as to form a wedge shape. The transfer opening limiting wall can then, for example, be a tube section designed correspondingly so as to form a wedge. It should in principle be pointed out that the passage region of the closure member is a region, designed so as to form a wedge shape, of the closure member or of the wall or walls forming the closure member, wherein this passage region encompasses at least one opening in the closure member, which opening is referred to here as a transfer opening. The closure region of the closure member could also be referred to as the first region of the closure member, and the passage region as the second region of the closure member. These regions advantageously do not overlap. The closure region of the closure member and the passage region of the closure member are, however, advantageously permanently rigidly connected to each other. The seals required for the sealed arrangement of the closure member on the valve seat can be arranged both on the closure member itself and on the valve seat. Where the seals are arranged on the closure member, particularly preferred alternative embodiments of the invention provide that the closure member has at least one seal in each case in the closure region and in the passage region. If the seal is arranged on the valve seat, preferred alternative embodiments provide that the closure member has in each case one seal seat in the closure region and in the passage region. The seal fastened on the valve seat is then pressed against this seal seat when the closure member is pressed with the respective region in sealing fashion against the valve seat and bears against it.

Preferred alternative embodiments provide that the valve has a valve housing and the valve seat is part of the valve housing. Particularly preferred alternative embodiments provide that two opposing valve seats are present in the valve, wherein the wedge-shaped closure region and possibly also the wedge-shaped passage region bear, in the closed and open positions, in sealing fashion against the opposing valve seats. In this position, the wedge-shaped regions of the closure member are then therefore arranged between the opposing valve seats which are usually also wedge-shaped in design. In these embodiments, in each case at least two opposing seals are then advantageously provided both in the closure region and in the passage region when the seals are arranged or fastened on the closure member.

There are in principle a wide range of different options for driving the closure member so that it moves along its angled and/or curved movement paths. A preferred alternative embodiment of the invention thus provides that the valve has a linear drive, preferably a single one, for moving the closure member back and forth between the open position and the closed position. It is particularly preferred here if the direction in which the wedge-shaped closure region and/or the wedge-shaped passage region of the closure member taper so as to form a wedge is perpendicular to the directions or movement of the linear drive. Alternative embodiments of the invention provide that the valve has a swivel drive, preferably a single one, for moving the closure member back and forth between the open position and the closed position. Combinations thereof are also conceivable.

If only one linear drive is used, preferred alternative embodiments provide that the linear drive and the closure member are connected to each other by at least one transmission lever, wherein the transmission lever is arranged so that it can swivel on both the linear drive and the closure member.

Valves according to the invention are used particularly preferably in so-called vacuum technology. The term vacuum technology is generally used when operating pressures of less than or equal to 0.001 mbar or 0.1 Pascal are reached. Vacuum valves are valves which are designed for these pressure ranges and/or corresponding pressure differences from the environment. However, it is also possible to generally refer to vacuum valves when they are designed for pressures below normal pressure, i.e. below 1 bar.

BRIEF DESCRIPTION OF THE DRAWINGS

Other features and details of preferred embodiments of the invention are explained by way of example with the aid of preferred exemplary embodiments in the description of the drawings, in which.

DETAILED DESCRIPTION OF THE PREFERRED EMBODIMENTS

Figure 1:
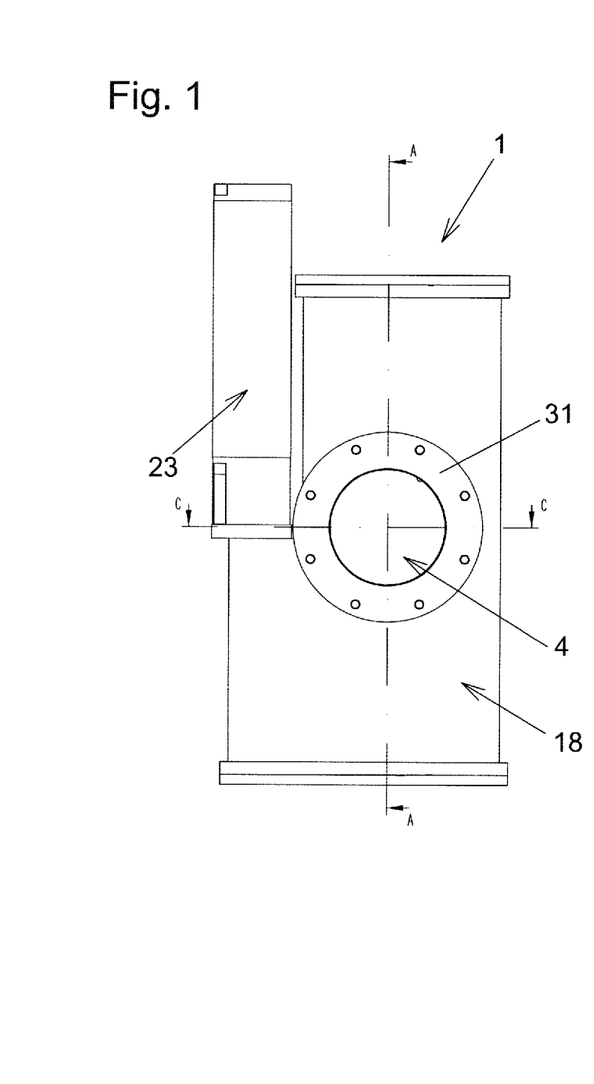
FIGS. 1 to 5 show different views of an exemplary embodiment according to the invention of a vacuum valve, wherein the vacuum valve is situated in the closed position.

In FIG. 1, a front view of a valve 1 situated in the closed position is shown. The valve opening 4 can be clearly seen here, closed by the closed position of the closure region 3 of the closure member 2. The valve opening is here in each case an opening the valve housing 18 on opposing sides of the valve housing 18 and the space located in between. A flange 31 is attached in each case on both sides. The valve according to the invention can be attached with this flange 31 to process chambers, connecting lines and the like. The linear drive, which can be seen only from outside in FIG. 1, is labeled with the reference numeral 23.

Figure 2:
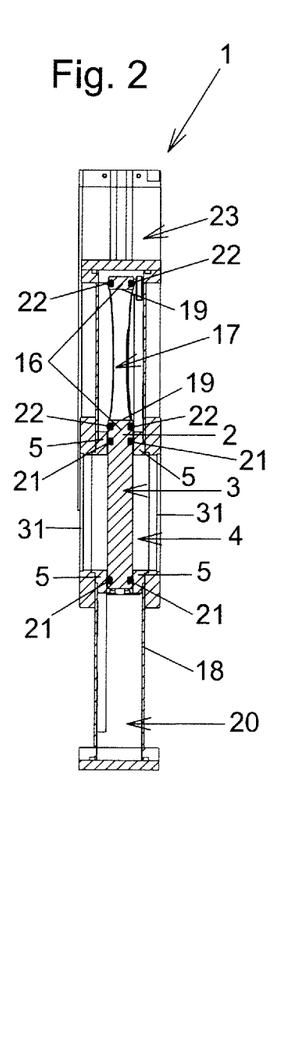

The vertical section through the valve 1 along the section line AA is shown in FIG. 2. It can be clearly seen there that the closure member 2 has two regions which are arranged so that they are separated from each other but are fixedly connected to each other as a single piece. On the one hand, there is the closure region 3 which is pressed, in the closed position of the valve 1 or the closure member 2, in sealing fashion with its seals 21 against the opposing valve seats 5, as a result of which the valve opening 4 is closed. That region of the closure member 2 which is referred to as the passage region 16 and in which the transfer opening 17 is arranged is situated above the closure region. The passage region 16 of the closure member 2 thus surrounds the transfer opening 17. The outputs of the transfer opening 17 in the passage region 16 are in each case surrounded by a seal 22.

Figure 3:
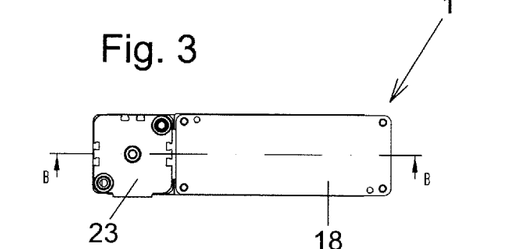
Figure 4:
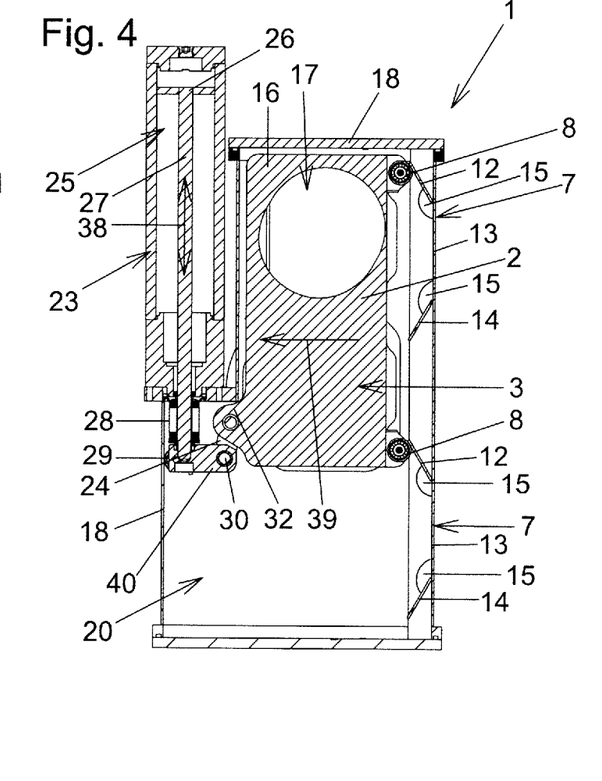
Figure 7:
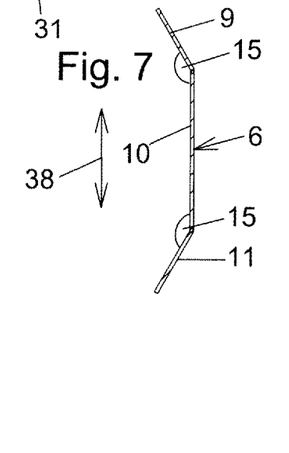
FIG. 7 shows the movement path of the closure member of the first exemplary embodiment.

FIG. 3 shows a plan view of the valve 1. The section line BB is shown in FIG. 3. The corresponding section through the valve 1 along the section line BB is shown in FIG. 4. The section according to FIG. 4 thus shows a view into the interior 20 of the valve housing 18 of the closure member 2, in the closed position, which is likewise shown in section there. The inner structure of the linear drive 23 used to move the closure member along the movement path 6 can be clearly seen in this view in section. The linear drive 23 is here a pneumatic piston/cylinder arrangement. It comprises the cylinder 25 in which the piston 26 is mounted so that it can be displaced in a known fashion along the linear movement direction 38 of the linear drive 23. Different pressures in the cylinder cavities arranged in each case on opposing sides of the piston are applied in a known fashion in order to displace the piston 26 in the cylinder 25. The piston 26 is fixedly connected to the piston rod 27. The latter passes out to the cylinder 25 via a rotatable sealed bellows 28 and carries a head piece 40. This head piece 40 and hence the piston rod 27 too are supported on one side by the support roller 29 on the adjacent wall region of the valve housing 18. The articulated connection to the closure member 2 and its attachment lug 32 is situated on the opposite side. The connection between the piston rod 27 and its head piece 40 and the closure member 2 and its attachment lug 32 is effected by a swivelable transmission lever 24 which is arranged so that it can swivel via corresponding joints 30 on both the head piece 40 or the piston rod 27, and hence the linear drive 23, and on the closure member 2. The direction 39 marked in FIGS. 4 and 5 in which the wedge-shaped closure region 3 and the wedge-shaped passage region 16 taper so as to form a wedge is perpendicular to the linear movement directions 38, indicated by the double arrow, of the linear drive 23. In order to guide the closure member on its travel between the closed position and the open position according to the invention along a movement path 6 which is angled here, in the exemplary embodiment shown at total of four slide paths 7 are present, only two of which can be seen in their entirety in FIG. 4 owing to the position of the plane of section, and one of which can be seen partially in the region of the transfer opening 17. In the exemplary embodiment shown, the slide paths 7 are arranged fixedly on the valve housing 18. Rollers 8, by which the closure member 2, driven by the linear drive 23, rolls away on the slide paths 7 and is thus forced along the double-angled movement path 6 shown schematically in FIG. 7, are situated on the closure member 2. The movement path 6 can be visualized by following and charting any point on the closure member 2 during the movement between the closed position and the open position, or vice versa. The movement path 6 usually has the same course as the slide path 7 or slide paths 7.

In the exemplary embodiment shown, the movement path 6 has three movement path sections 9, 10 and 11. The middle movement path section 10 runs parallel to the linear movement direction 38 of the linear drive 23. The two movement path sections 9 and 11 which are joined in each case to its ends are in each case arranged so that they are angled with respect to the movement path section 10. The angle 15 between the movement path sections 9 and 10, and 10 and 11, advantageously lies, as mentioned already at the beginning within an angular range of 135° to 170°, particularly preferably 145° to 155°. In the concrete exemplary embodiment, it is 150°. The upper end of the angled movement section 9 is then reached when the closure member 2 is situated in its closed position in which the closure region 3 is pressed against the valve seat 5 such that the valve opening 4 is closed and sealed. The lower end of the lower angled movement path section 11 is reached in the open position of the closure member 2 when, as shown in FIGS. 11 to 16, the passage region 16 is pressed in sealing fashion against the valve seat 5 and the transfer opening 17 is arranged so that it is aligned with the valve opening 4 such that the valve opening 4 is fully opened and the fluids and/or solids can be transported through it.

In order to force the closure member 2 along the movement path 6, the slide paths 7 are designed so that they correspond with the movement path 6. They too also have three slide path sections 12, 13 and 14 in each case. The respective central slide path section 13 lies in each case parallel to the linear movement direction 38 of the linear drive 23. The slide path sections 12 and 14 at the ends are in each case angled at the corresponding angle 15 to the central slide path section 13. The angle 15 of the slide path 7 are here the same as the angles 15 of the movement path. The closure member 2 rolls with the rollers 8 along the slide path 7. In the closed position, the rollers are situated in each case in the end region of the respective upper slide path section 12 of the respective slide path 7, as can be clearly seen in FIG. 4. As a result, the respective slide path section 12 presses, via the roller 8, the closure member 2 and hence the closure region 3 in sealing fashion against the valve seats 5, between the latter.

Figure 5:
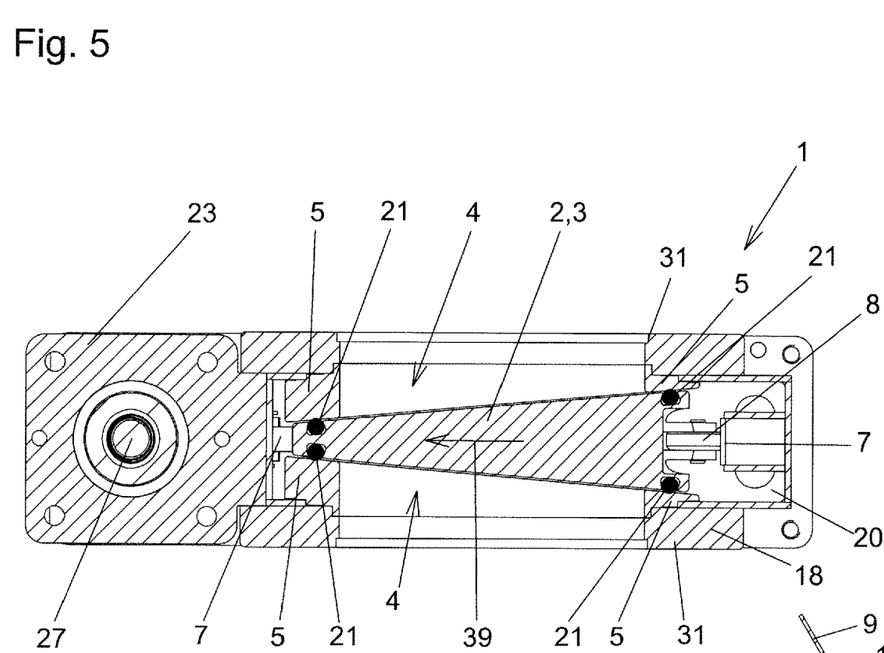

FIG. 5 shows a section along the horizontal section line CC according to FIG. 1 and hence a section through the wedge-shaped closure region 3 of the closure member 2, how it bears and is pressed in sealing fashion, by means of the seals 21, against the valve seats 5 which are here likewise arranged in a wedge shape. It is evident that, in this exemplary embodiment, the closure region 3 and the whole closure member 2 is made from a solid material. It would alternatively also be possible to design the closure member 2 as a hollow body which is limited by limiting walls which are correspondingly designed in a wedge shape.

Figure 6:
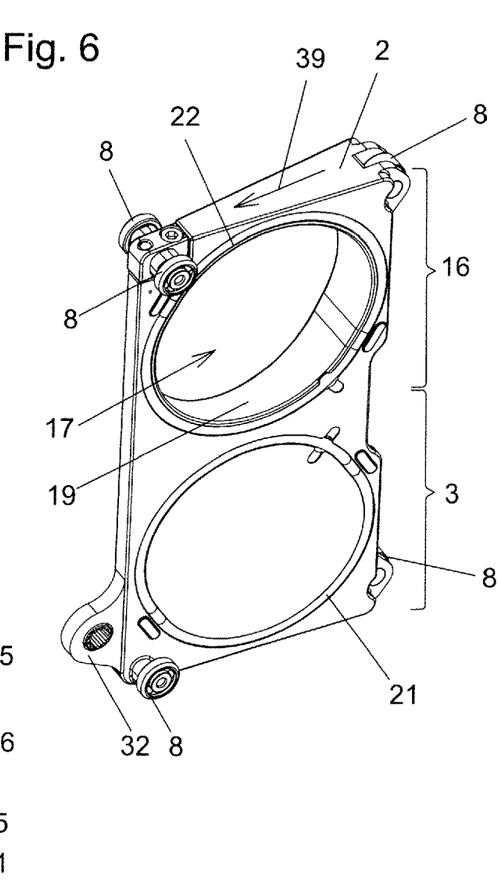
FIG. 6 shows the closure member of this first exemplary embodiment of the invention with a wedge-shaped closure region and a wedge-shaped passage region.

FIG. 6 shows the closure member 2 used in this exemplary embodiment, detached from the other components. The respective wedge-shaped regions, fixedly connected to each other, in the form of the closure region 3 and the passage region 16 can be clearly seen. An O-shaped seal 22 surrounding the transfer opening 17 is situated in each case on both sides of the passage region 16. Correspondingly formed seals 21 are arranged in the closure region 3, on both sides of the latter. The closure member 2 is formed in the closure region 3 in the region inside the seal 21 but as a closed wall in order to be able to completely close the valve opening 4 in the closed position. The transfer opening 17 is surrounded by the transfer opening limiting wall 19 of the passage region 16 of the closure member 2. It prevents fluids and/or solids from penetrating into the interior 20 of the valve housing when the closure member is situated in the open position in which the passage region 16 bears in sealing fashion against the valve seats 5 such that the transfer opening 17 is aligned with the valve opening 4 in order thus to release the valve opening 4. As already described at the beginning, the transfer opening limiting wall is produced automatically in a passage region 16 designed from solid material when the transfer opening 17 is introduced into the passage region 16. If the passage region 16 or the whole closure member 2 is designed as a hollow body surrounded by limiting walls arranged in a wedge shape, the transfer opening limiting wall 19, i.e. for example a correspondingly wedge-shaped tube piece, can connect the two limiting walls of the passage region 16 to each other.

As already described, FIG. 7 shows by way of example the movement path 6, designed so that it is angled, of this exemplary embodiment.

In order to move the valve from the closed position shown in FIGS. 1 to 5 into the open position shown in FIGS. 11 to 16, the closure member 2 is moved downward by the linear drive 23. The slide path 7 and its upper slide path sections 12 here first press the closure region 3 away from the valve seat 5. The rollers 8 then roll along the respective central slide path section 13. At this movement path section 10, the closure member 2 is moved parallel to the linear movement direction 38 of the linear drive 23. When in this closing movement, the rollers 8 then meet the respective lower slide path section 14, the closure member 2 with its passage region 16 is pressed between the valve seats 5 with a movement component in the direction 39 in order to come to rest in sealing fashion between the valve seats 5 in the final position, in the form of the open position, shown in FIGS. 11 to 16. The interior 20 of the valve housing 16 is also sealed in the open position. In contrast, the valve opening 4 is opened by virtue of the aligned arrangement of the transfer opening 17 such that fluids and/or objects can be transported through the valve opening 4 and hence through the transfer opening 17 as well.

Figure 8:
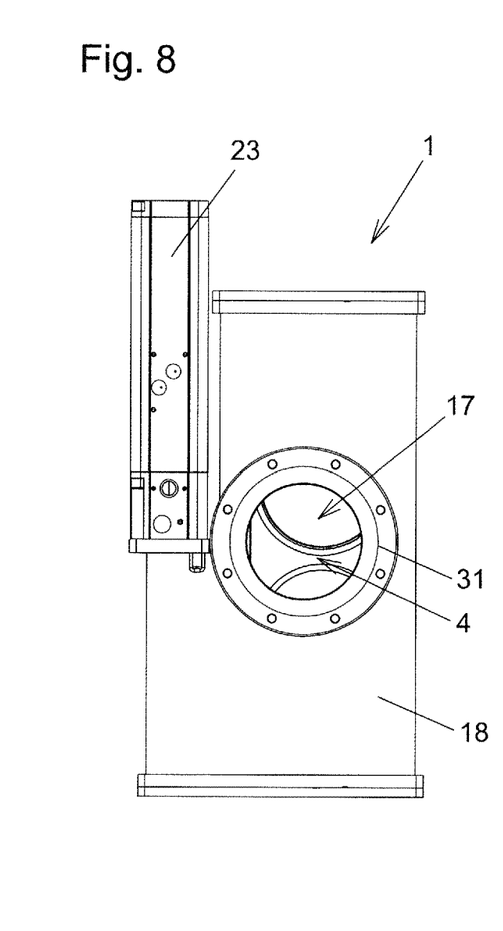
FIGS. 8 to 10 show views of an intermediate position of the closure member of this first exemplary embodiment.
Figure 9:
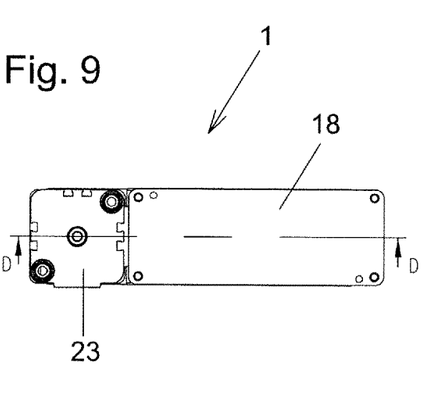
Figure 10:
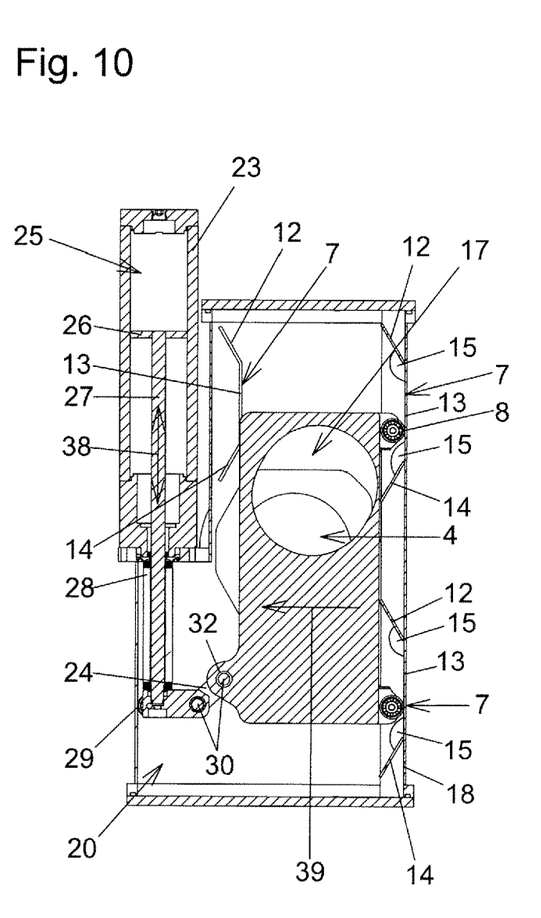
Figure 11:
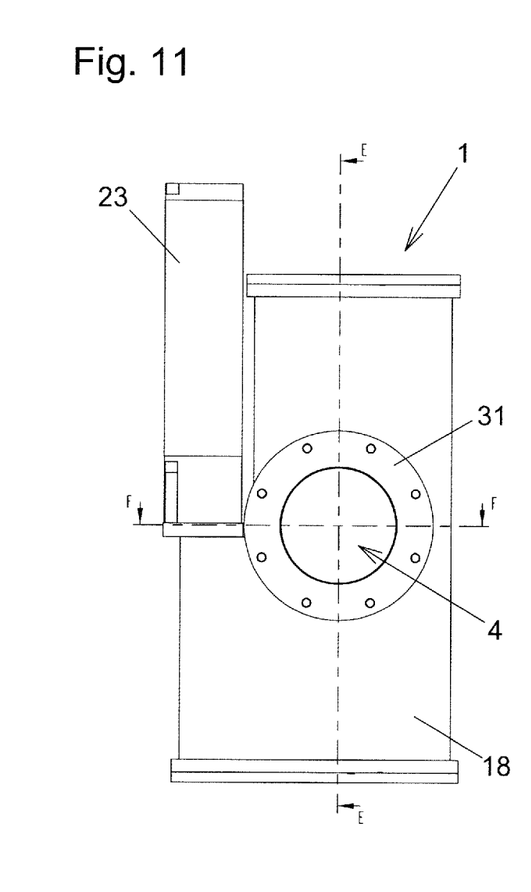
FIGS. 11 to 16 show views of the open position of this first exemplary embodiment of a valve according to the invention.

An intermediate position of a situation when the closure member 2 moves along the central movement path section 10 of the movement path 6 is shown in FIGS. 8 to 10. In this position, as can be seen in FIGS. 8 and 10, the transfer opening 17 is arranged so that it is only partially aligned with the valve opening 4. In these intermediate positions, neither the closure region 3 nor the passage region 16 are pressed in sealing fashion against the valve seat 5. The articulated mounting of the transmission lever 24 via the joints 30 on both the closure member 2 and the linear drive 23 enables the movements of the closure member parallel to the direction 39, in addition to the movement along the direction 38.

Figure 12:
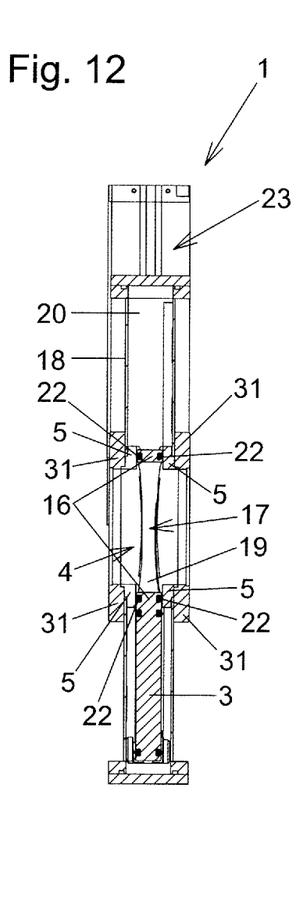
Figure 13:
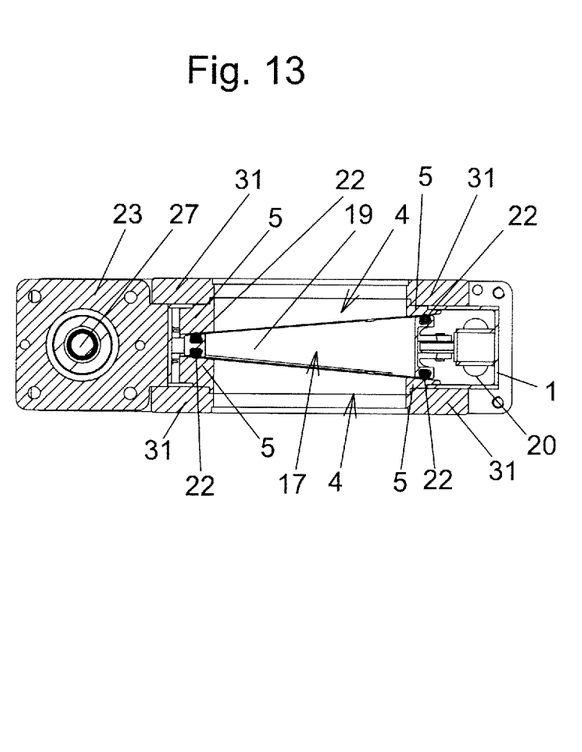

In FIGS. 11 to 16 which show the open position, FIG. 11 again shows a corresponding front view of the valve 1 from outside. FIG. 12 shows the longitudinal section along the section line EE from FIG. 11, and FIG. 13 the horizontal section along the section line FF from FIG. 11. It can be clearly seen in FIG. 12 how the passage region 16 is pressed in the open position against the valve seats 5 in such a way that, on the one hand, the transfer opening 17 is arranged so that it is aligned with the valve opening 4 and the latter can be passed through. On the other hand, the closed transfer opening limiting wall 19 and the sealing action by means of the seals 22 on the valve seat 5 prevent fluids and/or solids which, in this position, pass through the valve opening from being able to penetrate into the interior 20 of the valve body 18. FIG. 13 shows the same situation in a horizontal section. Here too, the wedge-shaped design of the passage region 16 and also the transfer opening 17, as well as the wedge-shaped arrangement of the valve seats 5, can in turn be clearly seen.

Figure 14:
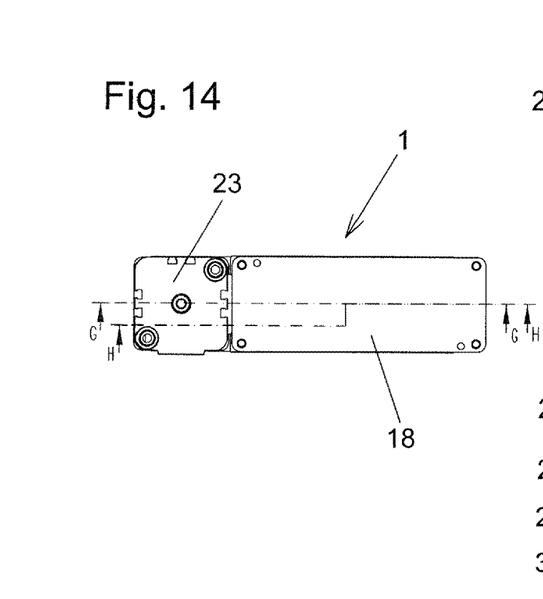
Figure 15:
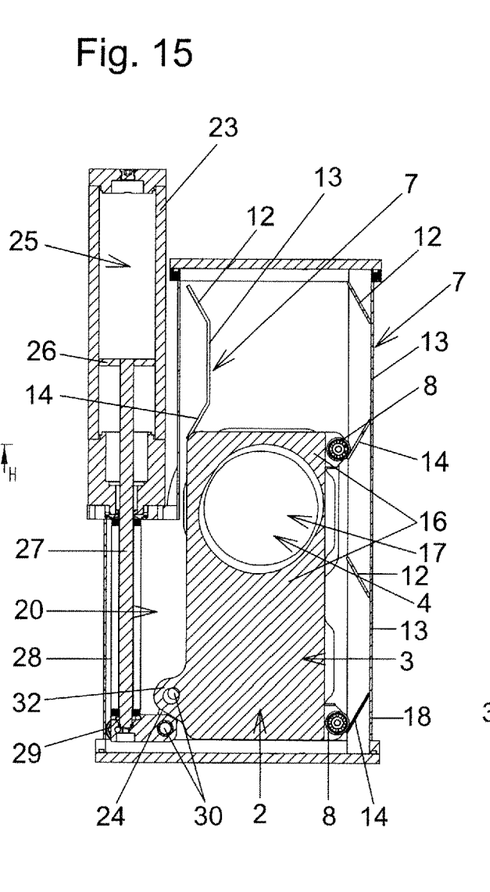
Figure 16:
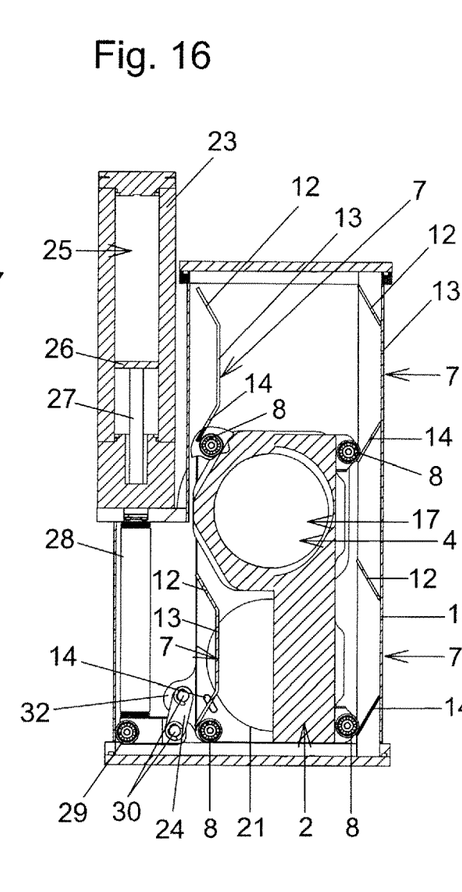

FIG. 14 shows a plan view of two section lines GG and HH. The section along the section line GG is shown in FIG. 15. In addition, the section along the angled section line HH is shown in FIG. 16 in order to be able to show, at least in one view, all four slide paths 7 and the rollers 8 guided thereon. It can also be clearly seen in FIGS. 15 and 16 that the rollers are in each case situated at the end of the lower angled slide path section 14 in order thus to press the passage region 16 in sealing fashion against the valve seats 5.

Figure 17:
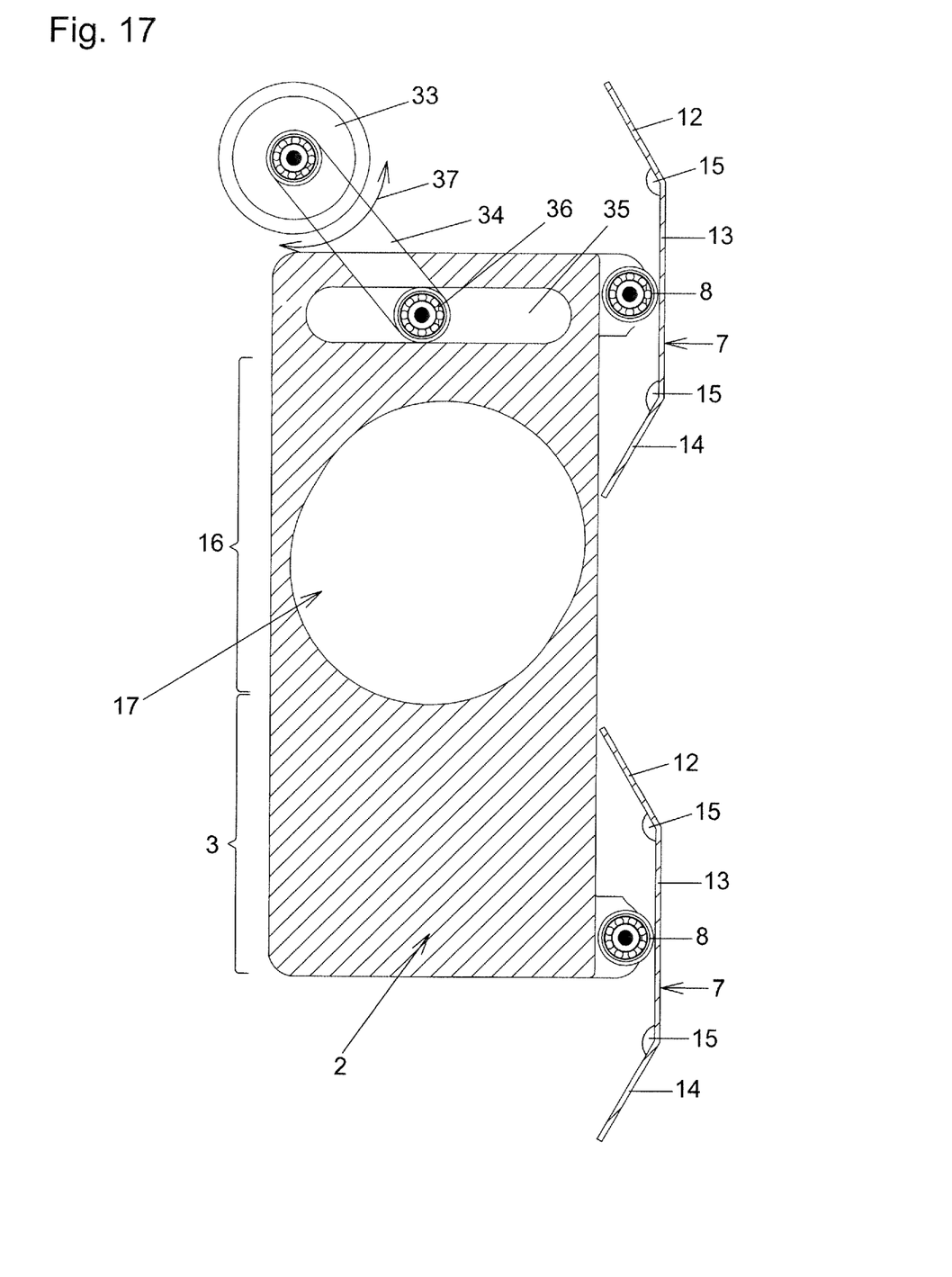
FIGS. 17 and 18 show schematically drawn concepts for alternative embodiments of the invention.

FIG. 17 shows schematically an alternative embodiment of the invention, wherein only the drive 23 designed as a swivel drive, the closure member 2 with the wedge-shaped closure region 3 and the wedge-shaped passage region 16 and two of the four slide paths 7 are shown. The remaining slide paths 7, and also the valve housing 18 with the valve opening 4, the valve seats 5, and the flanges 31 can in principle have a similar design to the first exemplary embodiment. In this exemplary embodiment, the closure member 2 is moved by means of the swivel drive 33 along an angled movement path 6 with a similar design to FIG. 7. For this purpose, the swivel drive has a drive lever 34 which can be swiveled in the swiveling directions 37 and is guided with a guide roller 36 in a slot-like guide groove 35 of the closure member 2.

Figure 18:
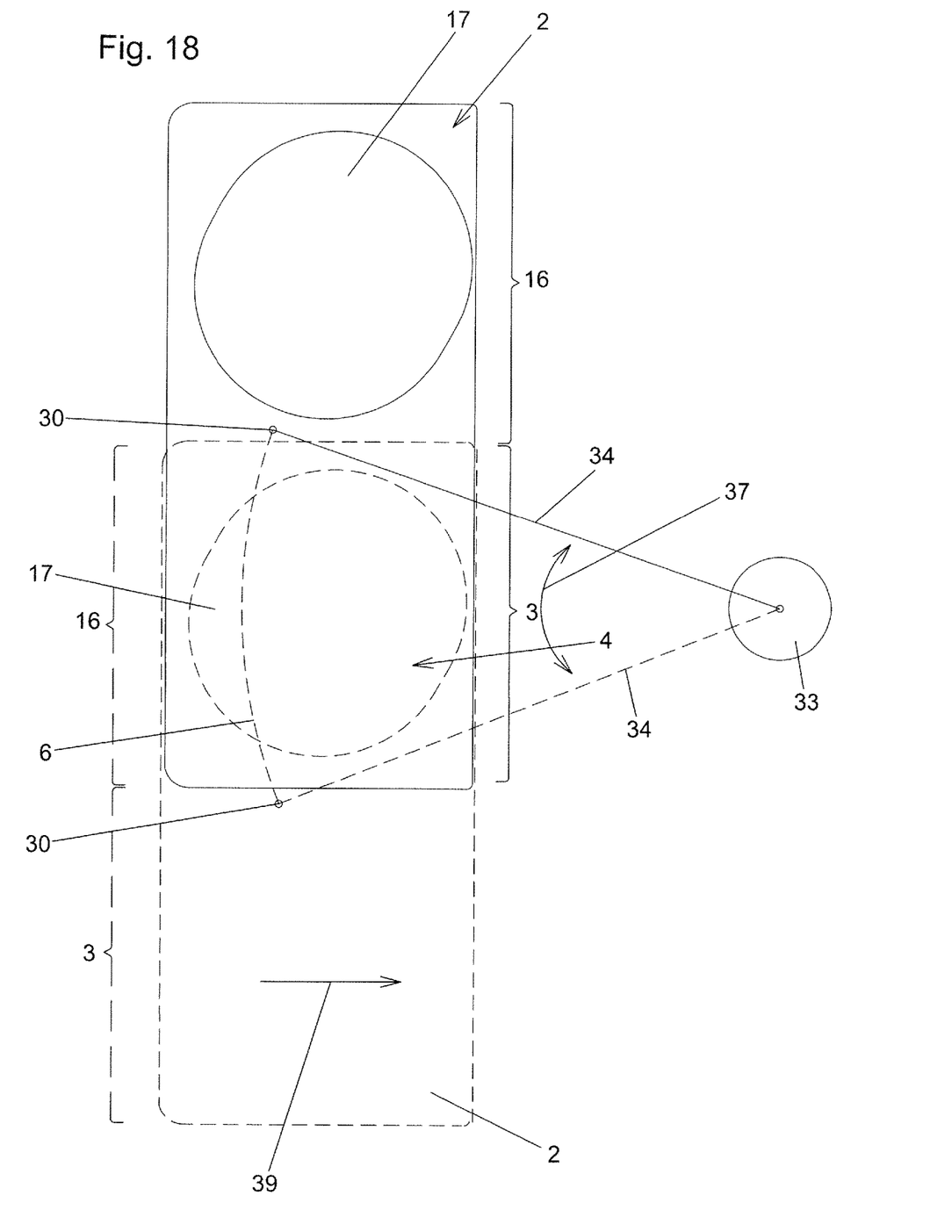

FIG. 18 shows, likewise schematically, a second of numerous possible alternatives. In order to move the closure member 2 along the movement path 6, a swivel drive 33 is likewise used which moves a drive lever 34 back and forth in the swiveling directions 37. In FIG. 18, the closure member 2 is shown in solid lines the raised closed position and in dashed lines in the lowered open position. The positions of the closure region 3 and the passage region 16 are in each case shown in a longitudinal section. In the lower position shown in dashed lines, the transfer opening 17 is in turn arranged so that it is aligned with the valve opening 4 (not shown here). Here too, the valve housing 18, the valve seats 5, and the flanges 31 are not shown explicitly. They too can have a similar design to the first exemplary embodiment, wherein it should, however, be noted that in this exemplary embodiment the closure region 3 and the passage region 16 taper in a wedge-like fashion in the direction 39 indicated in FIG. 18 such that the valve seats 5 need to have a corresponding design and arrangement. In any case, FIG. 18 is an exemplary embodiment of the invention, albeit a highly schematic one, with a curved movement path 6.

KEY TO REFERENCE NUMERALS

1 valve
   2 closure member
   3 closure region
   4 valve opening
   5 valve seat
   6 movement path
   7 slide path
   8 roller
   9 movement path section
  10 movement path section 11 movement path section
12 slide path section
13 slide path section
14 slide path section
15 angle
16 passage region
17 transfer opening
18 valve housing
19 transfer opening limiting wall
20 interior
21 seal
22 seal
23 linear drive
24 transmission lever
25 cylinder
26 piston
27 piston rod
28 bellows
29 support roller
30 joint
31 flange
32 attachment lug
33 swivel drive
34 drive lever
35 guide groove
36 guide roller
37 swiveling direction
38 linear movement path
39 direction
40 head piece

The invention claimed is:

1. A valve comprising:
   at least one closure member having a wedge-shaped closure region,
   at least one valve seat surrounding a valve opening of the valve,
   the at least one closure member being movable between a closed position in which the wedge-shaped closure region lies against the at least one valve seat in sealing fashion and closes the valve opening and an open position in which the at least one closure member frees the valve opening for at least one of fluids or solids to be transported through the valve opening,
   the at least one closure member with the wedge-shaped closure region is mounted for movement back and forth on a movement path between the closed position and the open position, and the movement path is at least one of angled or curved,
   at least one slide path for guiding the at least one closure member along the movement path, and the at least one slide path includes a first slide path section that is at least one of angled or curved relative to a second slide path section,
   wherein the at least one closure member further comprises a wedge-shaped passage region which surrounds a transfer opening in the at least one closure member,
   in the open position, the at least one closure member bears with the passage region in sealing fashion against the at least one valve seat, and in the open position the transfer opening of the at least one closure member for the through transportation of at least one of fluids or solids is arranged in alignment with the valve opening, and
   the movement path has a central movement path section and two movement path sections which are connected in each case to ends of the central movement path section, and the movement path sections which are connected in each case at ends thereof to the central movement path section are in each case arranged at an angle relative to the central movement path section.

2. The valve as claimed in claim 1, further comprising at least one roller or at least one slider for guiding the at least one closure member along the movement path, and the roller or the slider is guided by the at least one slide path.

3. The valve as claimed in claim 1, wherein at least one of the movement path or the at least one slide path is angled.

4. The valve as claimed in claim 1, wherein in each case two successive movement path sections of the movement path enclose an angle of 135° to 170°.

5. The valve as claimed in claim 1, wherein the movement path is curved along an entire length thereof.

6. The valve as claimed in claim 1, further comprising a valve housing, and the at least one valve seat is part of the valve housing.

7. The valve as claimed in claim 6, wherein the transfer opening is surrounded by a transfer opening limiting wall of the passage region of the at least one closure member in order to prevent penetration of the at least one of fluids or solids into an interior of the valve housing.

8. The valve as claimed in claim 7, wherein the closure region of the at least one closure member and the passage region of the at least one closure member are permanently rigidly connected to each other.

9. The valve as claimed in claim 7, wherein the at least one closure member has in each case at least one seal or at least one seal seat in the closure region and in the passage region.

10. The valve as claimed in claim 1, further comprising at least one of a linear drive or swivel drive for moving the at least one closure member back and forth between the open position and the closed position.

11. The valve as claimed in claim 10, wherein the linear drive and the at least one closure member are connected to each other by at least one transmission lever, and the transmission lever is arranged to be swivelable on both the linear drive and the at least one closure member.

12. The valve as claimed in claim 1, wherein the valve is a vacuum valve.

13. A valve comprising:
   at least one closure member having a wedge-shaped closure region,
   at least one valve seat surrounding a valve opening of the valve,
   the at least one closure member being movable between a closed position in which the wedge-shaped closure region lies against the at least one valve seat in sealing fashion and closes the valve opening and an open position in which the at least one closure member frees the valve opening for at least one of fluids or solids to be transported through the valve opening,
   the at least one closure member with the wedge-shaped closure region is mounted for movement back and forth on a movement path between the closed position and the open position, and the movement path is at least one of angled or curved,
   at least one slide path for guiding the at least one closure member along the movement path, and the at least one slide path includes a first slide path section that is at least one of angled or curved relative to a second slide path section,
   wherein the at least one closure member further comprises a wedge-shaped passage region which surrounds a transfer opening in the at least one closure member, in the open position, the at least one closure member bears with the passage region in sealing fashion against the at least one valve seat, and in the open position the transfer opening of the at least one closure member for the through transportation of at least one of fluids or solids is arranged in alignment with the valve opening, wherein the at least one slide path has a central slide path section and two slide path sections which are connected in each case to ends of the central slide path section, and the slide path sections which are connected in each case at ends thereof to the central slide path section are in each case arranged at an angle relative to the central slide path section.

14. The valve as claimed in claim 13, wherein in each case two successive slide path sections of the at least one slide path enclose an angle of 135° to 170°.

* * * * *